United States Patent [19]

Sakashita

[11] Patent Number: 4,993,307

[45] Date of Patent: Feb. 19, 1991

[54] ELECTRONIC MUSICAL INSTRUMENT WITH A COUPLER EFFECT FUNCTION

[75] Inventor: Shigeo Sakashita, Hamura, Japan

[73] Assignee: Casio Computer Co., Ltd., Tokyo, Japan

[21] Appl. No.: 324,223

[22] Filed: Mar. 15, 1989

[30] Foreign Application Priority Data

Mar. 22, 1988 [JP] Japan ................................ 63-36418

[51] Int. Cl.[5] ........................ G01H 1/18; G01H 1/36

[52] U.S. Cl. ........................................ 84/615; 84/634; 84/622; 84/735; 84/742

[58] Field of Search ........... 84/631, 664, 708, DIG. 4, 84/615, 616, 634, 637, 622, 653, 654, 666, 669, 678, 681, 692, 659, 712, 715, 729, 723, 732, 735, 737, 742

[56] References Cited

U.S. PATENT DOCUMENTS

| | | | |
|---|---|---|---|
| 3,767,833 | 10/1973 | Noble . | |
| 4,257,303 | 3/1981 | Nagai et al. | 84/DIG. 4 X |
| 4,379,422 | 4/1983 | Munch et al. | 84/664 X |
| 4,387,618 | 6/1983 | Simmons, Jr. | 84/637 |
| 4,429,606 | 2/1984 | Aoki | 84/669 X |
| 4,440,057 | 4/1984 | Ishibashi | 84/622 |
| 4,450,742 | 5/1984 | Sugiura | 84/715 X |
| 4,468,998 | 9/1984 | Baggi | 84/669 X |
| 4,699,039 | 10/1987 | Oguri et al. | 84/637 X |

*Primary Examiner*—W. B. Perkey
*Attorney, Agent, or Firm*—Frishauf, Holtz, Goodman & Woodward

[57] ABSTRACT

A present electronic musical instrument is applied to an electronic wind instrument and an electronic keyboard instrument. At least one piece of pitch difference data representing an arbitrary pitch difference with respect to a first pitch that is to be designated by a pitch designation section is stored in a memory section. Before or during a musical performance, the pitch difference data is selected, and an original tone having the first pitch and a coupler tone having a pitch different from the first pitch are simultaneously generated with a pitch difference corresponding to the selected pitch difference data. The timbres of the original tone and the coupler tone may be set different from each other.

16 Claims, 9 Drawing Sheets

ELECTRONIC MUSICAL INSTRUMENT WITH A COUPLER EFFECT FUNCTION

BACKGROUND OF THE INVENTION

1. Field of the Invention

The present invention relates to an electronic musical instrument having a coupler-effect generation function effective for use in an electronic wind instrument, electronic keyboard instrument, etc., and, more particularly, to a technique for adding a coupler effect wherein an original tone at the first pitch specified by a pitch designation operation is generated and, at the same time, a coupler tone at a second pitch stored in advance in a memory is generated.

2. Description of the Related Art

Recent progress and development of an electronic technique and digital technique are prominent, and various electronic musical instruments such as an electronic wind instrument and an electronic keyboard instrument using the techniques are developed and become very popular. Of these electronic musical instruments, some electronic keyboard instruments have a tone generation technique called a coupler effect producing function which, even when one pitch is designated, generates a first tone or an original tone at a first pitch specified by the pitch designation and, at the same time, generates a second tone or a coupler tone at a second pitch different from the first pitch. According to an electronic keyboard instrument having this tone generation function, it is possible to simultaneously generate two musical tones having a predetermined pitch difference and improve the performance effect.

According to a conventional electronic keyboard instrument, pitch designation for providing a coupler effect is carried out by storing into a memory section pitch difference data representing a pitch difference between a pitch specified by depression of a specific key and a pitch specified by depression of the next key and using this pitch difference data as the pitch difference for the coupler effect.

The conventional instrument, however, requires that, before playing a musical piece, a player should set a predetermined pitch difference each time, so that a pitch difference for a coupler effect cannot be properly altered during musical performance. Therefore, a fine performance effect for sequentially changing the coupler effect with progression of a melody cannot be provided.

As described above, electronic wind instruments are also developed. The electronic wind instruments detect a breath operation or lip operation of a player as an electric signal by means of a breath sensor or lip sensor provided at a mouth section to thereby finely control the volume, pitch, etc. of a musical tone electronically generated, and can therefore generate a musical tone matched with the feeling of the player. Accordingly, there is an idea of applying the aforementioned pitch designation technique for coupler effect as used in the electronic keyboard instruments to the above electronic wind instruments.

However, designation of a pitch for electronic wind instruments, unlike that for electronic keyboard instruments, is executed by operating in combination of a plurality of pitch designation switches. It is not, therefore, possible to apply the pitch designation technique for coupler effect, which is used for electronic keyboard instruments, as it is to electronic wind instrument.

SUMMARY OF THE INVENTION

Accordingly, it is an object of this invention to provide an electronic musical instrument which can instantaneously produce a coupler effect having a predetermined pitch difference even during musical performance with progress of a melody.

It is another object of this invention to provide an electronic musical instrument which can store plural pieces of pitch difference data representing an arbitrary pitch difference as desired by a player, can select an arbitrary one of the plural pieces of pitch difference data and can simultaneously generate two musical tones with a pitch difference corresponding to this selected pitch difference data.

It is a different object of this invention to provide an electronic musical instrument which, when an arbitrary pitch difference data is selected from plural pieces of pitch difference data, can provide a visible display of a content of the selected pitch difference data.

It is a further object of this invention to provide an electronic wind instrument which can generate two musical tones at a pitch difference corresponding to predetermined pitch difference data when a breath operation starts.

It is a still further object of this invention to provide an electronic musical instrument which can make the timbres of two musical tones generated with a pitch difference corresponding to predetermined pitch difference data to be different from each other.

According to this invention, pitch designation means for designating a first pitch is provided on, for example, a hollow pipe at a location where it is easy for a player to place his (or her) fingers.

Further, pitch difference data setting means for setting pitch difference data of a coupler tone is provided on, for example, a hollow pipe as per the above pitch designation means.

Pitch difference memory means for storing plural pieces of pitch difference data to be set by the pitch difference data setting means is arranged in the hollow pipe.

Pitch difference data selecting means for selecting an arbitrary one of the plural pieces of pitch difference data stored in the pitch difference data memory means is arranged on the hollow pipe.

In addition, coupler tone pitch setting means for setting a second pitch for a coupler tone having a pitch difference corresponding to pitch difference data selected by the pitch difference data selecting means, with respect to the first pitch specified by the pitch designation means, is provided in the hollow pipe.

Furthermore, tone generating means for simultaneously generating a musical tone having the first pitch and a musical tone as a coupler tone having the second pitch, is provided in the hollow pipe.

According to the electronic musical instrument having the above various means, a player operates the pitch difference data setting means in advance to store plural pieces of pitch difference data corresponding to a plurality of coupler effects necessary for a musical performance in the pitch difference data memory means.

Then, the player operates the pitch designation means for designation of the first pitch in order to start playing a musical piece.

At this time, with progress in a musical performance, pitch difference data for providing a desired coupler effect in each performance is selected in real time from the pitch difference memory means by sequentially operating the pitch difference data selecting means.

Through the above operation, the pitch setting means sets in real time the second pitch for a coupler tone having a pitch difference corresponding to the pitch difference data selected by the pitch difference data selecting means, with respect to the first pitch specified by the pitch designation means.

The above operation simultaneously designates the first pitch and the second pitch for the coupler tone by a single performing operation. Based on these operations, a musical tone with the first pitch and a musical tone with the second pitch for a coupler tone are simultaneously generated by the tone generating means.

As described above, according to this invention, even during a musical performance, a coupler effect can be instantaneously changed as pre-set by the player by sequentially operating the pitch difference data selecting means.

DETAILED DESCRIPTION OF THE PREFERRED EMBODIMENTS

A preferred embodiment of this invention will now be described referring to the accompanying drawings.

Figure 1:
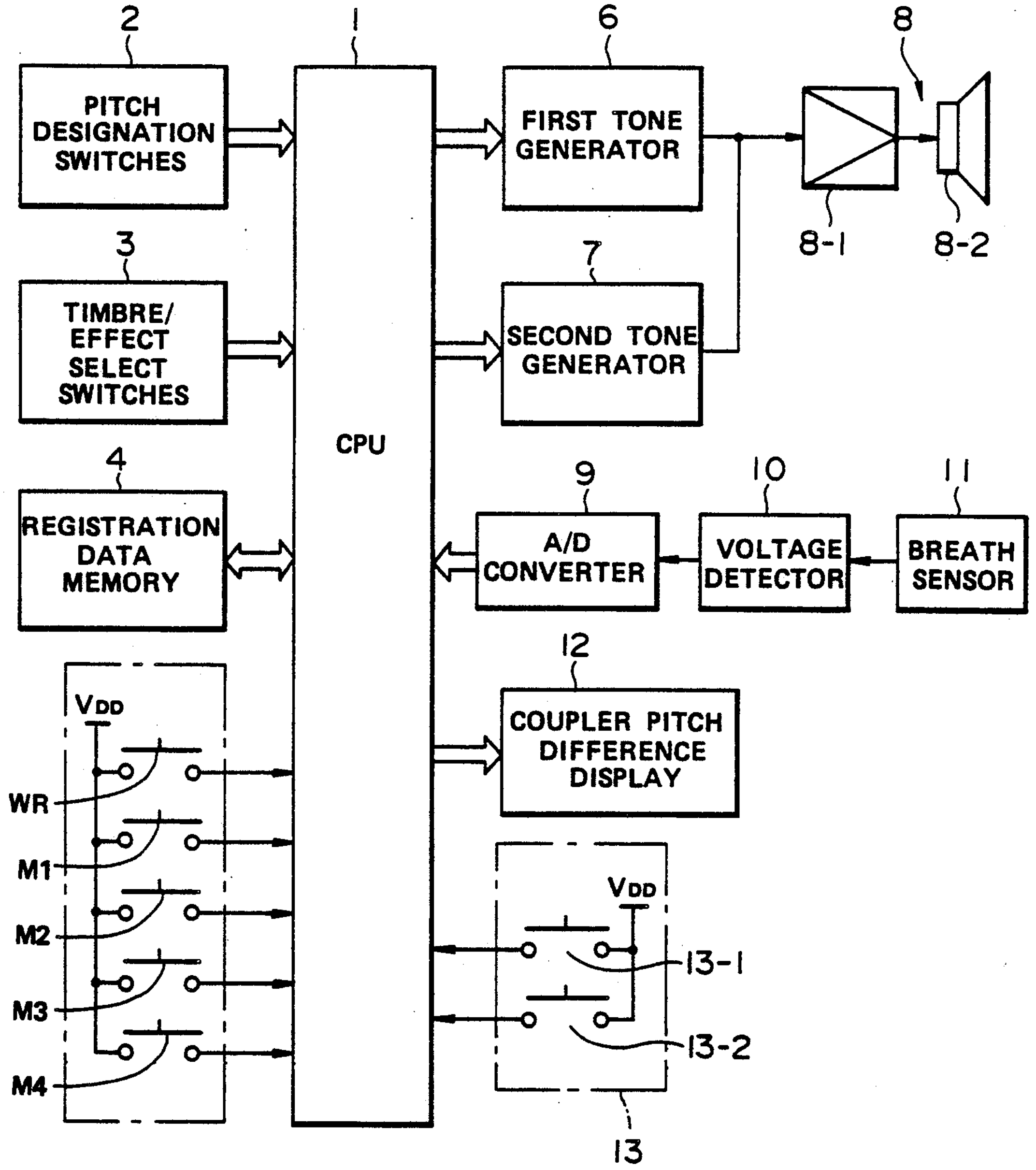
FIG. 1 is a diagram illustrating the configuration of one embodiment of this invention.

FIG. 1 illustrates the arrangement of one embodiment of this invention. Pitch (note) data designated by pitch designation switches 2 is input to a CPU (central processing unit) 1.

Timbre/effect select switches 3 serve to select the timbre/effect of a musical tone generated by a first tone generator 6 (to be described later) based on a pitch specified by the pitch designation switches 2 or a coupler tone (musical tone) generated by a second tone generator 7 (to be also described later). Select data on the timbre or effect is supplied to the CPU 1.

A registration data memory 4 is coupled to the CPU 1 and stores four sets of registration data such as coupler data, timbre data and effect data.

Coupler pitch difference setting switches 13 are coupled to the CPU 1 and alters and sets a coupler pitch difference or coupler data to be stored in the registration data memory 4. An UP switch 13-1 serves to increase the coupler pitch difference toward a high pitch, and a DOWN switch 13-2 serves to increase it toward a low pitch. Each setting switch 13 is applied with a driving voltage $V_{DD}$.

Registration select switches 5, which are coupled to the CPU 1, select four sets of registration data stored in the registration data memory 4 as desired by operating one of four select switches M1 to M4 and write the registration data presently selected and altered into the memory 4 by operation of a select switch WR at the same time as the switches M1–M4. Each switch 5 is applied with the driving voltage $V_{DD}$.

A coupler pitch difference display 12 is coupled to the CPU 1 and displays coupler pitch difference data of the presently-selected registration data, i.e., a coupler pitch difference.

A breath sensor 11 senses the strength or amount of breath of a player, and a voltage detector 10 detects a voltage according to the output of the sensor 11. The detected voltage is converted into digital data by an A/D converter 9 before being supplied to the CPU 1.

The first and second tone generators 6 and 7, each coupled to the CPU 1, generate a basic musical tone and a coupler tone respectively. The outputs of the tone generators 6 and 7 are supplied to a tone output section 8.

The tone output section comprises an amplifier 8-1 and a loud-speaker 8-2 and generates a musical tone as a sound.

Figure 2A:
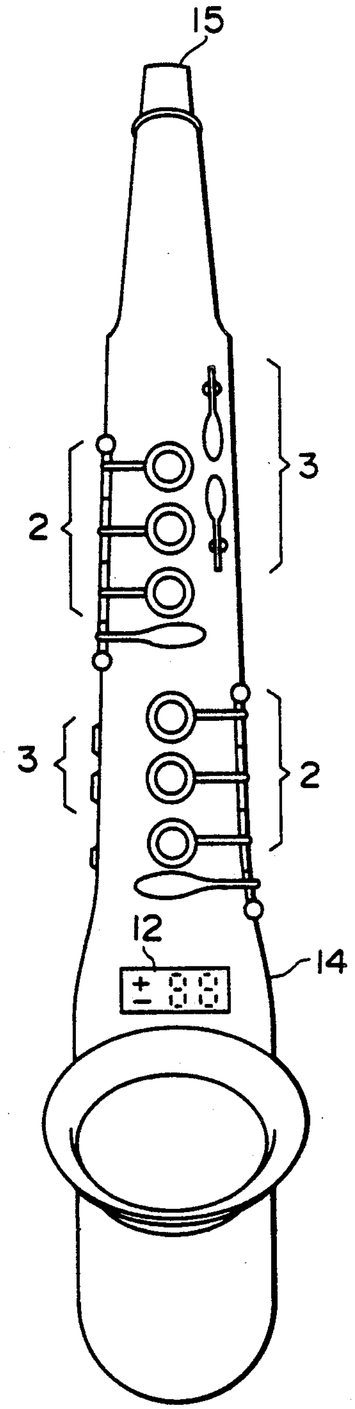
FIGS. 2*a* and 2*b* are external views of an electronic wind instrument according to this embodiment.
Figure 2B:
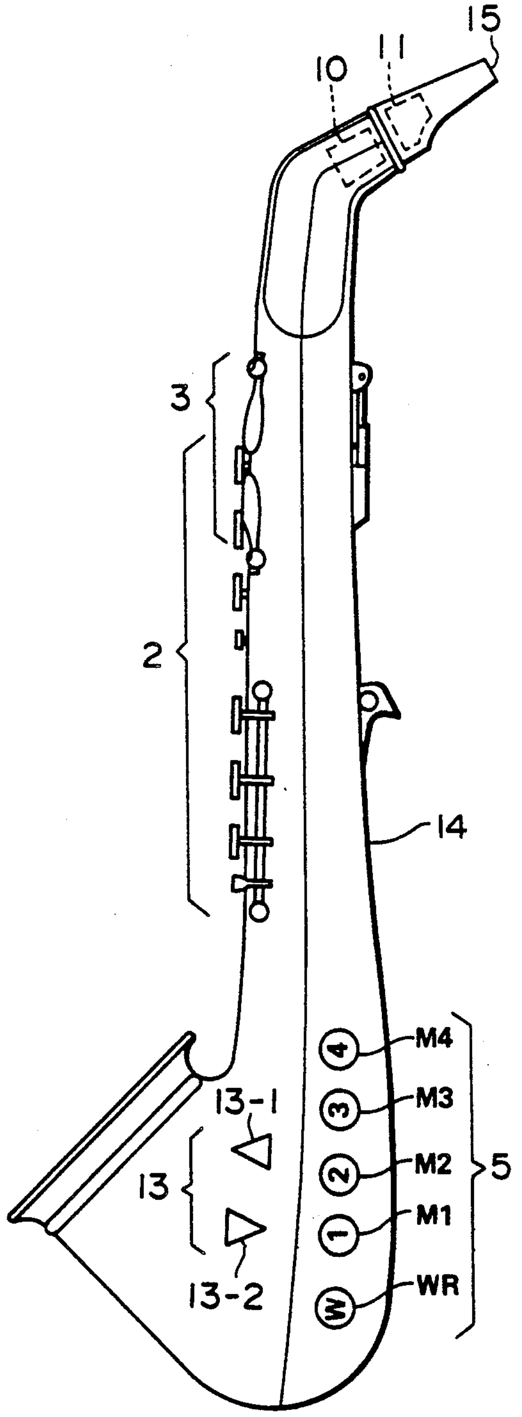

FIGS. 2*a* and 2*b* illustrate the exterior of an electronic wind instrument according to the embodiment shown in FIG. 1. Referring to these diagrams, the present electronic musical instrument according to this embodiment takes a form of a wind instrument having a hollow pipe section 14 as a main body. The aforementioned pitch designation switches 2, timbre/effect select switches 3, registration select switches 5 including the select switches M1–M4 and WR, and coupler pitch difference setting switches 13 including the UP switch 13-1 and DOWN switch 13-2 are arranged on the pipe section 14 at those locations where a player can easily place his fingers. The coupler pitch difference display 12 is located on the pipe section 14 where it is easy to view.

The breath sensor 11 and voltage detector 10 as shown in FIG. 1 are arranged at a mouth section 15 provided at the upper portion of the pipe section 14 shown in FIG. 2.

Those components shown in FIG. 1 which are not discussed above are provided at the interior of the pipe section 14.

Brief Operation

A description will now be given of the operation of the embodiment having the configuration as shown in FIGS. 1 and 2. Unless otherwise specified, FIGS. 1 and 2 should be referred to for the components mentioned below.

To begin with, the operation of this embodiment will be described briefly.

First, a player operates the timbre/effect select switches 3. The CPU 1 is monitoring the operational status of the switches 3 at predetermined time intervals under the control of a given program (not shown). When the CPU 1 detects a change in the operation status, it outputs data about the change to the first tone generator 6. As a result, the tone generator 6 generates a musical tone with a designated timbre and alters the state of the musical tone so that a specified effect should be added thereto.

The player then starts playing a music by blowing his breath through the mouth section 15 while operating the pitch designation switches 2 with his fingers to designate a pitch. In this case, the CPU 1 is monitoring the operation status of the pitch designation switches 2 at predetermined time intervals by a program (to be described later). When the CPU 1 detects a change in the operation status, it sends data about the change to the first tone generator 6. The tone generator 6 in turn sets the pitch (note) of a musical tone to be generated to a specified pitch.

The strength of the breath blown from the mouth section 15 is detected as digital data by the breath sensor 11. When this digital data exceeds a specific value, i.e., when the player blows breath stronger than a specific level, key-ON data is output to the first tone generator 6 from the CPU 1 so that the tone generator 6 starts generating a musical tone at the pitch with the timbre both specified by the previous operation. When the player stops blowing breath from the mouth section 15 and the aforementioned digital data falls below a specific value, key-OFF data is output to the first tone generator 6 from the CPU 1 so that the tone generator 6 stops generating the musical tone.

According to this embodiment, it is possible to generate a musical tone at the pitch specified by the pitch designation switches 2 (hereinafter called an original tone) from the first tone generator 6 in the above manner, as well as to generate a coupler tone from the second tone generator 7. The coupler tone mentioned here means a musical tone having a predetermined pitch difference with respect to the pitch designated by the pitch designation switches 2.

According to this embodiment, four types of coupler pitch differences or coupler data for generating the coupler tone can be stored in advance in the registration data memory 4. These data can be arbitrarily selected during a musical performance by operating the switches M1–M4 of the registration select switches 5 to thereby ensure alteration of the coupler pitch difference.

Further, four types of data such as timbre data and effect data including the coupler data may be stored in the memory 4. Consequently, the second tone generator 7 can generate a coupler tone having a timbre/effect different from that of the original one generated from the first tone generator 6. These four types of data can be arbitrarily selected and altered in real time during a musical performance. A description will now be given of a process associated with a coupler tone.

Configuration of Registration Data Memory

Figure 3:
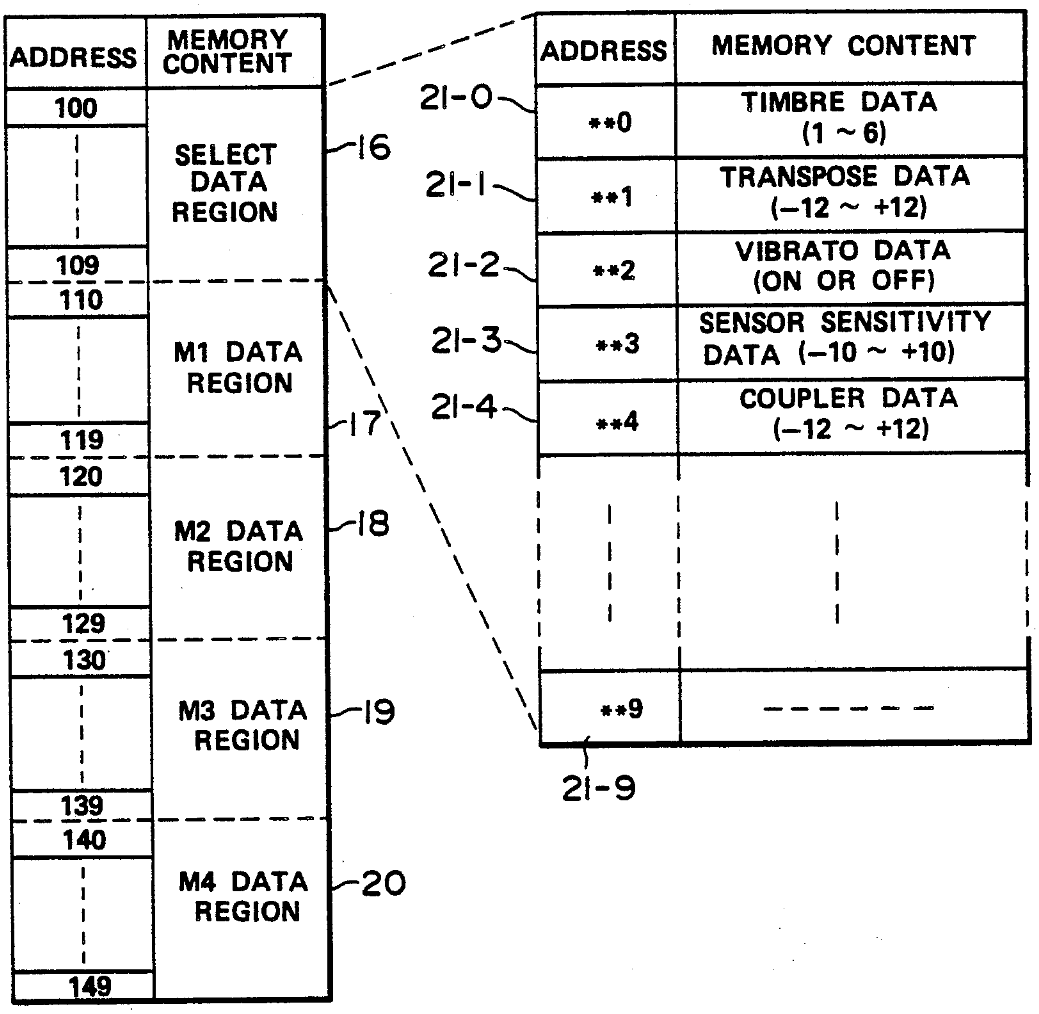
FIG 3 is a diagram illustrating the structure of a registrar data memory.

FIG. 3 illustrates the configuration of the registration data memory 4 shown in FIG. 1. M1 to M4 data regions 17 to 20 respectively located at addresses 110–119, 120–129, 130–139 and 140–149 serve to store four types of registration data for four coupler tones.

Arbitrary one of the four pieces of registration data stored in the M1–M4 data regions 17 to 20 is selected and copied in real time to a select data region 16 located at addresses 100–109 by operation of the select switches M1–M4 of the registration select switches 5 (which operation will be described later), and the second tone generator 7 generates a coupler tone based on the registration data in the select data region 16.

As described in a later section, the individual contents of the addresses 100–109 can be altered as desired. Further, the content of the select data region 16 can be arbitrarily copied and registered in any of the M1–M4 data regions 17–20 by depressing one of the select switches M1–M4 while the select switch WR is kept depressed. (This will also be described later.)

Each of the select data region 16 and M1–M4 data regions 17–20 consists of 9 registration data 21-0 to 21-9 as shown in FIG. 3. Here, "" in addresses "0" to "**9" indicates any one of "10," "11," "13" and "14."

The timbre data 21-0 represents the type of the timbre of a coupler tone generated by the second tone generator 7 and can specify six different timbres by numbers "1" to "6."

The transpose data 21-1 is data for transposing a coupler tone and can be specified within a range from −12 to +12, with 0 being a C major key and transposition taken for every ±1.

The vibrato data 21-2 specifies ON or OFF data which indicates whether or not a vibrato effect is given to a coupler tone by the second tone generator 7.

The sensor sensitivity data 21-3 serves to specify the sensitivity in a case where the second tone generator 7 changes the volume or pitch of a coupler tone in accordance with digital data output through the A/D converter 9 from the breath sensor 11 or data about the strength of the player's breath. This data 21-3 can be set within a range from −10 to +10. The greater the absolute value of the data, the greater the sensitivity of the sensor 11 to the strength of the player's breath. For a positive value given to the data 21-3, the stronger the breath blown from the mouth section 15, the greater the volume or the higher the pitch, and for a negative value given, the stronger the breath blown, the weaker the volume or the lower the pitch.

The coupler data 21-4 serves to set a coupler pitch difference between the pitch of an original tone generated from the first tone generator 6 and a coupler tone generated from the second tone generator 7. This data 21-4 can be set between −12 to +12 with a half pitch difference being given for every +1.

Several different registration data about an effect may also be stored besides the aforementioned various data in the memory 4, but their description will be omitted here.

Altering/Setting Of A Coupler Pitch Difference

A description will now be given of the operation in a case where the player can alter and set the pitch difference of a coupler tone as desired.

The pitch difference of a coupler tone can be altered by ± (half tone) by operating the UP switch 13-1 or DOWN switch 13-2 included in the coupler pitch difference setting switches 13. This alteration changes the coupler data 21-4 at the address 104 in the select data region 16 (FIG. 3) of the registration data memory 4.

The above operation is executed by the CPU 1 scanning the operational status of the UP switch 13-1 and DOWN switch 13-2 at predetermined time intervals according to a predetermined altering/setting program.

Figure 4:
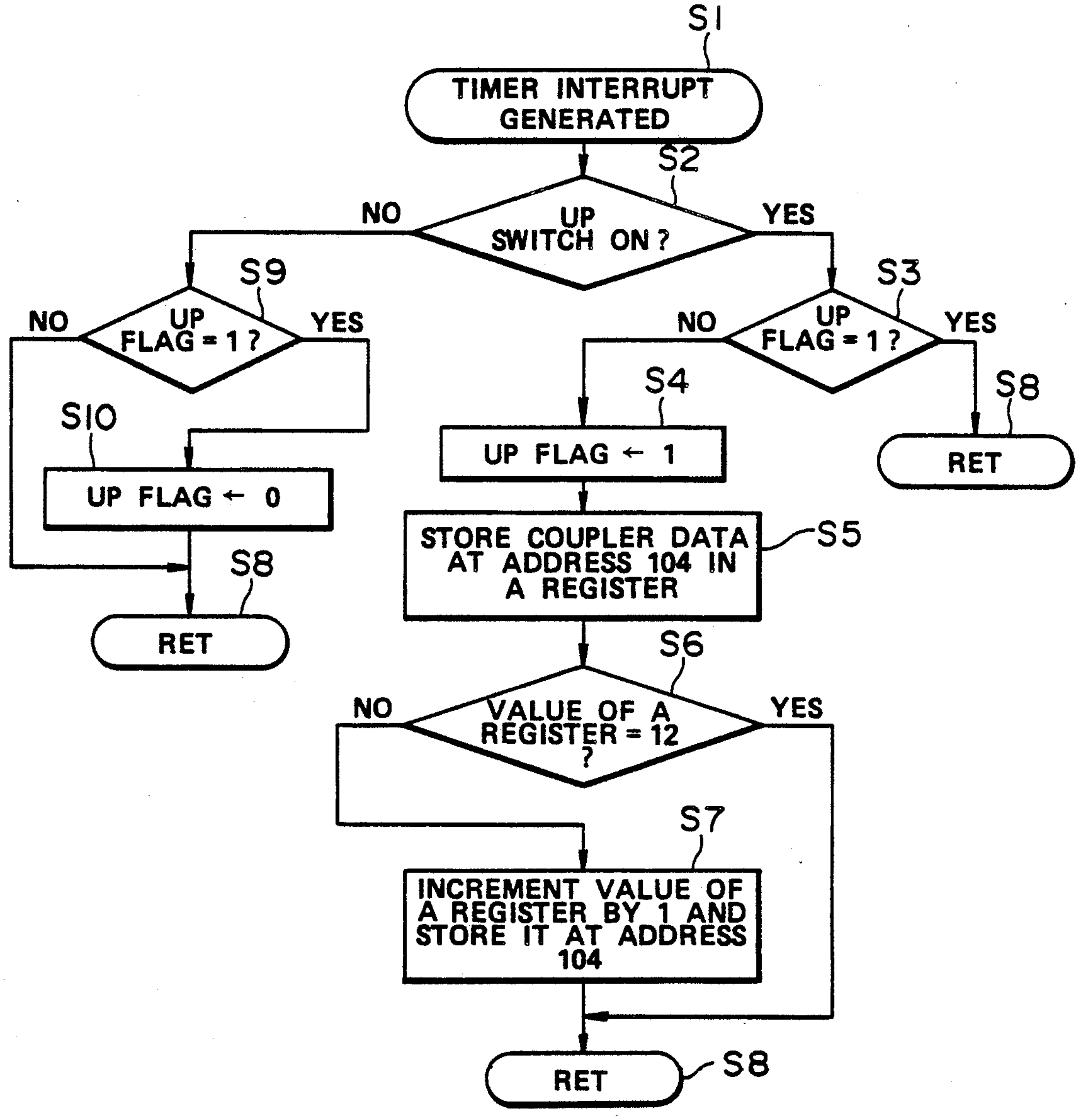
FIG. 4 is a flowchart for explaining a scan operation of an UP switch of coupler pitch difference setting switches.

FIG. 4 illustrates an operational flowchart for a case where the CPU 1 scans the UP switch 13-1.

First, the CPU 1 executes the flowchart shown in FIG. 4 by an interrupt from a timer (not illustrated) built in the CPU 1 in order to perform the above altering/setting process at predetermined time intervals.

When a timer interrupt occurs (S1 in FIG. 4; please refer to FIG. 4 hereinafter), the CPU 1 detects whether or not the UP switch 13-1 is ON (S2).

If the UP switch 13-1 is not ON (S2→S9), the CPU 1 discriminates whether an UP flag (not shown) in the CPU 1 is 1 or 0. If this flag is 0, the operation returns to the original status (ready status) (S9→S8), and if the flag is 1, it is set to 0 and the operation returns to the original status (S9→S10→S8). The function of the UP flag will be described later.

When the UP switch 13-1 is turned ON (S2→S3), as the UP flag is 0, it is set to 1 (S3→S4), and the coupler data 21-4 (see FIG. 3) at the address 104 of the registration data memory 4 is stored in an A register (not shown) in the CPU 1 (S5).

Then, it is discriminated whether the value of the A register is 12 or smaller; if the value is 12, the operation returns to the original status without executing anything (S6→S8).

If the value of the A register is smaller than 12, it is set to +1 and is stored at the address 104 in the memory 4 before the operation returns to the original status (S6→S7→S8).

Through the above operation, every time the player turns the UP switch 13-1 ON, the coupler data 21-4 (FIG. 3) at the address 104 in the memory 4 is altered by +1 within a range below +12.

If a timer interrupt (indicated in S1 of FIG. 4) reoccurs due to the UP switch 13-1 being kept depressed by the player and the ON status of the UP switch is detected (S2→S3), since the UP flag is 1 in this case, the operation returns to the original status without executing anything to thereby prevent the value in the A register from being incremented again by +1 (S3→S8).

Since the operation of the CPU 1 is executed according to the same flowchart as shown in FIG. 4 in a case where the CPU 1 scans the DOWN switch 13-2, its detailed description will be omitted. However, a DOWN flag is provided instead of the UP flag of FIG. 4 in the CPU 1 and the decision in S2 of FIG. 2 is made as to whether or not the DOWN switch 13-2 is ON. Further, in S6 it is discriminated whether the value of the A register is 12 or greater, and in S7 the value of the A register is decremented by 1 and the result is stored at the address 104 in the registration data memory 4.

Through the above operation, every time the player turns the DOWN switch 13-2 ON, the coupler data 21-4 (FIG. 3) at the address 104 in the memory 4 is altered by −1 within a range above −12.

The content of the coupler data 21-4 at the address 104 in the memory 4 resulting from the above operation is displayed on the display 12 to permit the player to confirm the operation status at a glance. This process is executed by the CPU 1 according to a program (not shown).

Altering/Setting Of Timbre Data, Etc. For A Coupler Tone

A description will now be given of the operation in a case where the player alters and sets timbre data, etc., for a coupler tone as desired.

First, the timbre of a coupler tone can be altered by +1 between timbre numbers 1 to 6 every time the timbre select switch of the timbre/effect select switches 3 is turned ON. Next to the timbre number 6 is 1. The alteration changes the timbre data 21-0 at the address 100 in the select data region 16 (FIG. 3) of the registration data memory 4.

The above operation is executed by the CPU 1 scanning the operational status of the timbre select switch of the timbre/effect select switches 3 at predetermined time intervals according to a predetermined altering/setting program.

Figure 5:
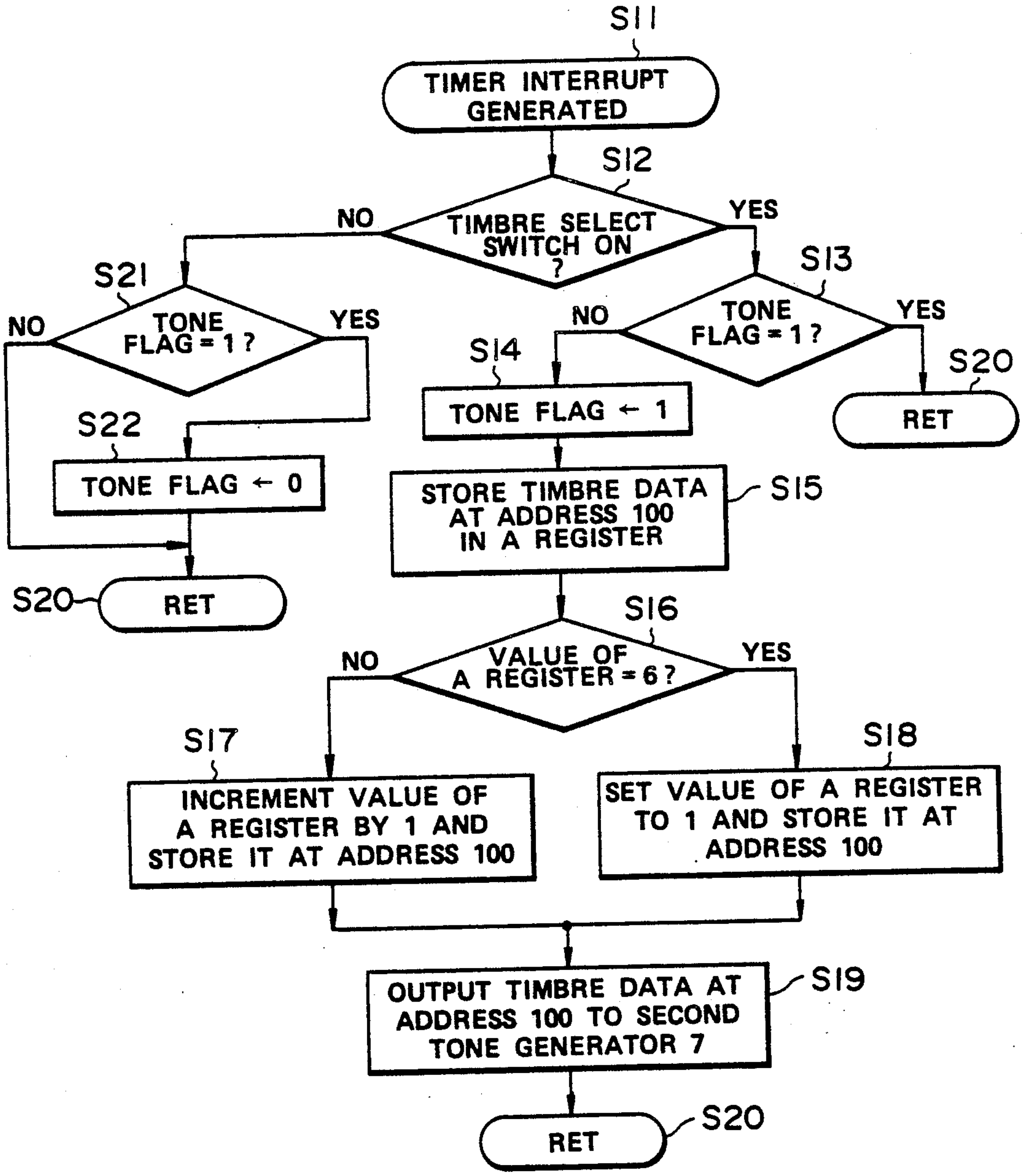
FIG. 5 is a flowchart for explaining a scan operation of a timbre select switch for a coupler tone.

FIG. 5 illustrates an operational flowchart for this case.

When a timer interrupt occurs (S11 in FIG. 5; please refer to FIG. 5 hereinafter) as in the case of FIG. 4, the CPU 1 detects whether or not the coupler timbre select switch is ON (S12).

If the this switch is not ON (S12→S21), the CPU 1 discriminates whether a TONE flag (not shown; described later) in the CPU 1 is 1 or 0. If this flag is 0, the operation returns to the original status (S21→S20), and if the flag is 1, it is set to 0 and the operation returns to the original status (S21→S22→S20).

When the timbre select switch is turned ON (S12→S13), as the TONE flag is 0, it is set to 1 (S13→S14), and the timbre data 21- (see FIG. 3) at the address 100 of the registration data memory 4 is stored in the A register (not shown) in the CPU 1 (S15).

Then, it is discriminated whether the value of the A register is 6 or smaller, if the value of the A register is smaller than 6, it is set to +1 and is stored at the address 100 in the memory 4 (S16→S17).

If the value is 6, the value of the A register is set again to 1 and is stored at the address 100 (S16→S18).

After the above operation, the timbre data 21-0 (FIG. 3) at the address 100 in the memory 4 is sent to the second tone generator 7 and the operation returns to the original status (S19→S20).

Through the above operation, every time the player turns the timbre select switch ON, the timbre data 21-0 (FIG. 3) at the address 100 in the memory 4 is altered by 1 within a range between timbre numbers 1 to 6. At the same time, the content of the setting in the second tone generator 7 is changed instantaneously and the timbre of the coupler tone is altered in real time.

Like in the case of FIG. 4, even when the timbre select switch is kept depressed by the player, since the TONE flag is 1, it is possible to prevent the timbre data from being altered again (S13→S20).

The operation for altering an effect-associated setting such as the transpose data 21-1 of a coupler tone, vibrato data 21-2, sensor sensitivity data 21-3, etc. (see FIG. 3) will be executed by operating a corresponding effect select switch of the timbre/effect select switches 3 in the same manner as the above timbre altering operation. The flowchart for the operation is similar to the one shown in FIG. 5. Therefore, a detailed description of the effect altering operation will be omitted here. In either case, every time the corresponding select switch is operated, each individual data 21-1, 21-2 or 21-3 at the address 101, 102 or 103 in the memory 4 is altered. At the same time, the content of the setting in the second tone generator 7 is instantaneously changed as per the timbre altering operation and the effect to the coupler tone can be altered in real time.

Registering Of Registration Data

A description will now be given of the operation for copying and registering each of the contents of the select data region 16 (FIG. 3), altered and set at the addresses 100–109 in the memory 4 by the operations shown in FIGS. 4 and 5, into any of the M1–M4 data regions 17–20 in the same memory 4.

The above registering operation can be executed by the player's depressing the desired one of the select switches M1–M4 of the registration select switches 5 while keeping the select switch WR depressed.

The above operation is executed by the CPU 1 scanning the operational status of each of the registration select switches 5 at predetermined time intervals according to a predetermined registering program.

Figure 6:
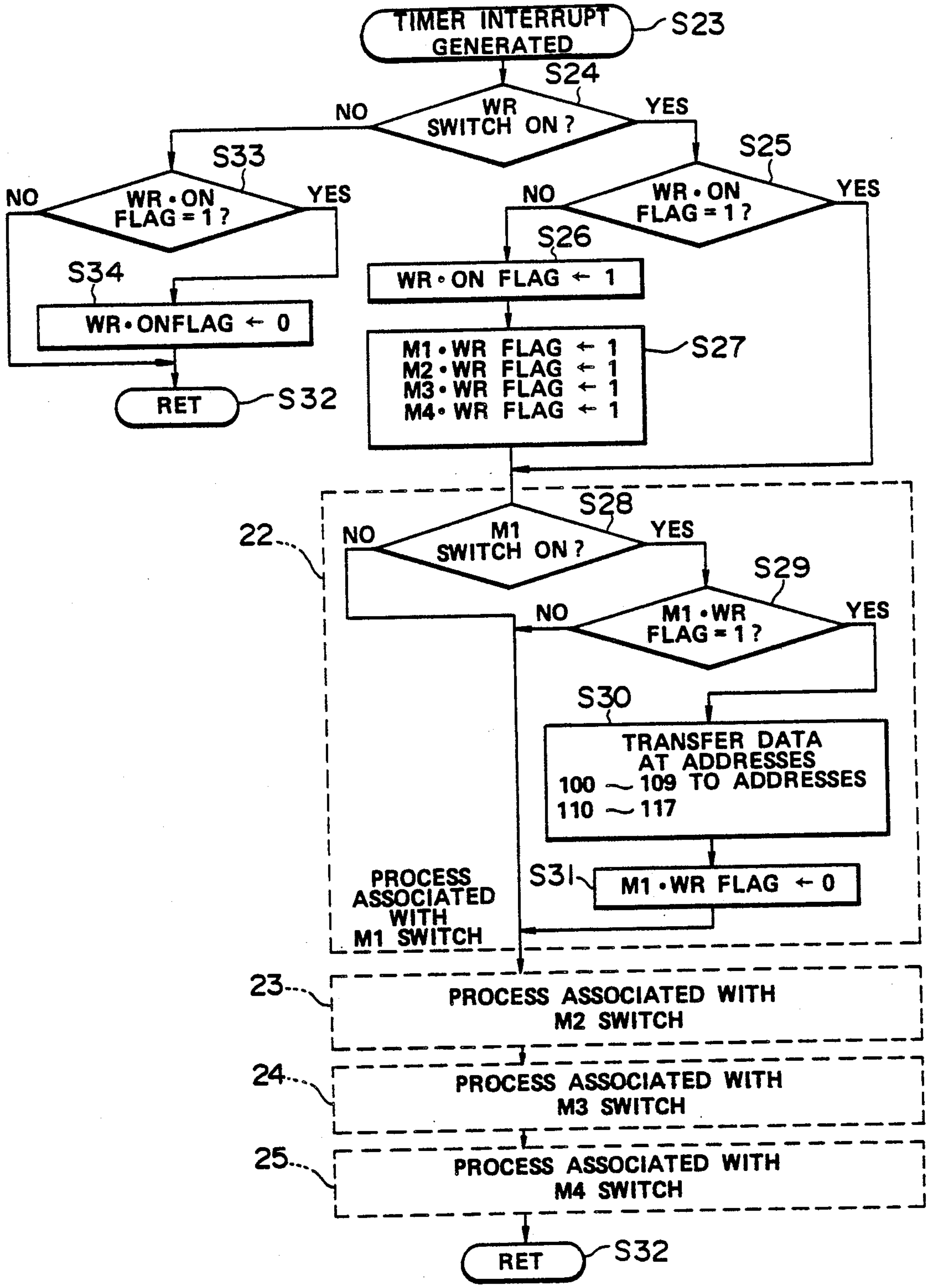
FIG. 6 is a flowchart for explaining a registration operation of registration data.

FIG. 6 illustrates an operational flowchart for this case. When a timer interrupt occurs (S11 in FIG. 6; please refer to FIG. 6 hereinafter) as in the case of FIG. 4, the CPU 1 detects whether or not the select switch WR is ON (S24).

If this switch is not ON (S24→S33), the CPU 1 discriminates whether a WR.ON flag (not shown; described later) in the CPU 1 is 1 or 0. If this flag is 0, the operation returns to the original status (S33→S32), and if the flag is 1, it is set to 0 and the operation returns to the original status (S33→S34→S32).

When the select switch WR is turned ON (S24→S25), as the WR.ON flag is 0, it is set to 1 (S13→S14) and all of four M1.WR to M4.WR flags (to be described later) are set to 1 (S27).

Subsequently, after processes associated with the individual select switches M1–M4 are executed as indicated by broken blocks 22–25 in FIG. 6, the operation returns to the original state (broken block 22→broken block 23→broken block 24 broken block 25→S32). Since the individual processes (broken blocks 22 to 25) are the same, a detailed description of the first process associated with the select switch M1 (as indicated by the broken block 22) will be given below.

First, it is detected whether or not the select switch M1 is ON (S28). If it is not ON, the operation advances to the next process associated with the select switch M2 (as indicated by the broken block 23).

If the select switch M1 is turned ON by the player's depressing this switch M1 while the select switch WR is kept depressed (S28→S29), since the M1.WR flag is 1 (see S27), the individual pieces of data in the select data region 16 at the addresses 100–109 of the memory 4 are copied to the M1 data region 17 at the addresses 110–119 (S29→S30).

Subsequently, the M1.WR flag is set to 0 (S31) and the operation advances to the next process associated with the select switch M2 (see broken block 23).

Through the above operation, when the player turns the select switch M1 of the registration select switches 5 while keeping the select switch WR depressed, the contents of the select data region 16 at the addresses 100–109 in the memory 4 are registered into the M1 data region 17 (FIG. 3) at the addresses 110–119.

When the player keeps the select switch M1 depressed while holding the select switch WR depressed and a timer interrupt occurs again as in S23 of FIG. 6 permitting the CPU 1 to detect the ON state of the switch M1, since the WR.ON flag is already 1 in this case and the M1.WR flag is reset to 0, nothing will be done with regard to the switch M1 and the operation advances to the processes 23–25 associated with the other select switches M2–M4. This prevents the same data associated with the switch M1 from being copied (S25→S28→S29 broken block 23).

Even when the select switches M2–M4 are operated, the above operation will be executed in the same manner for registering data into the M2–M4 data regions 18–20.

Selection of Registration Data

A description will now be given of an operation, as different from the above registering operation, for selecting any of four sets of registration data registered in the individual M1–M4 data regions 17–20 (FIG. 3) in the memory 4 in order for the player to make a musical performance.

The above selection operation can be executed by the player's depressing only the desired one of the select switches M1–M4 of the registration select switches 5 without depressing the select switch WR.

The above operation is executed by the CPU 1 scanning the operational status of each of the registration select switches 5 at predetermined time intervals according to a predetermined selecting program.

Figure 7:
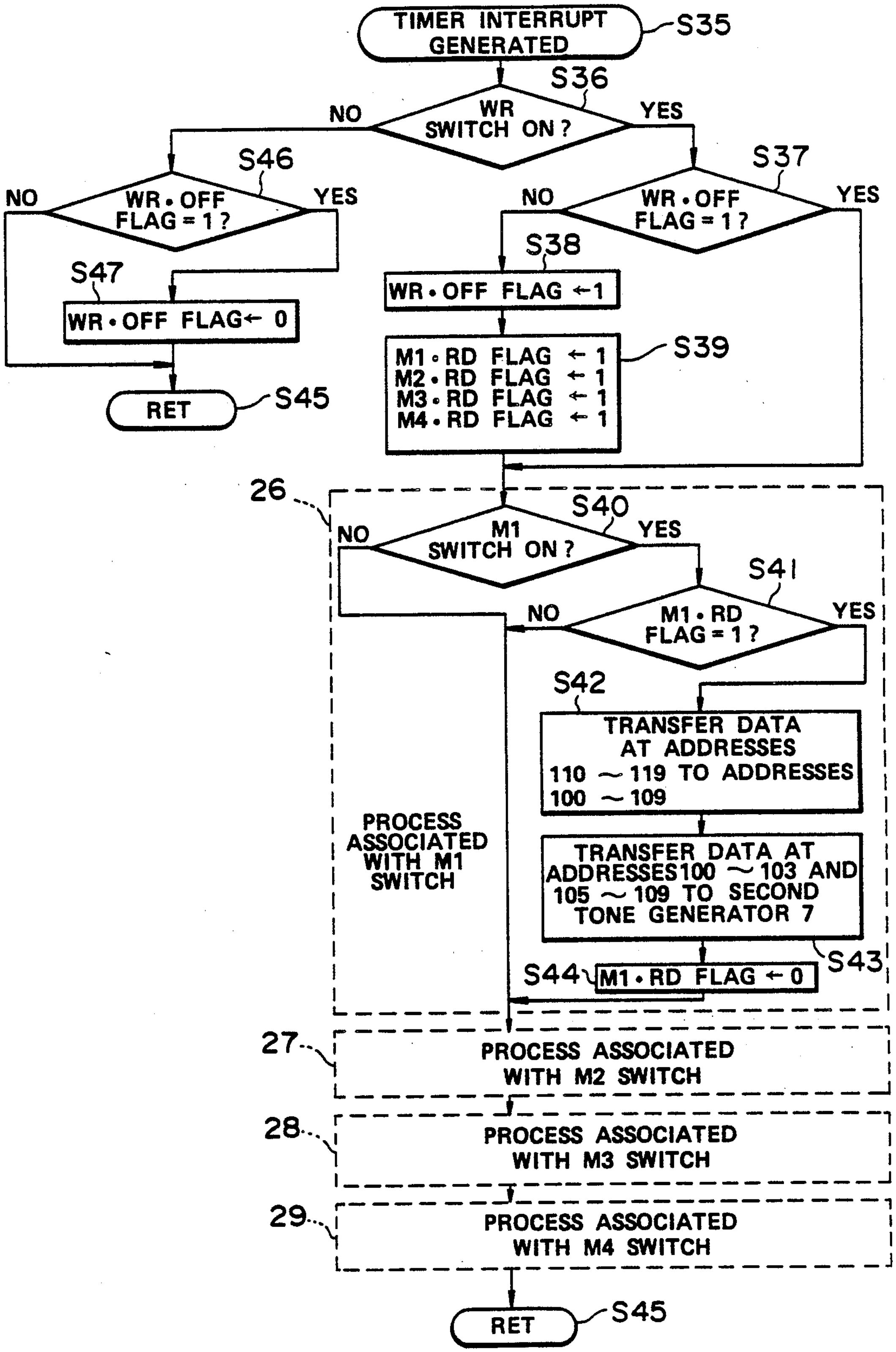
FIG. 7 is a flowchart for explaining a select operation of registration data.

FIG. 7 illustrates an operational flowchart for this case. When a timer interrupt occurs (S35 in FIG. 7; please refer to FIG. 7 hereinafter) as in the case of FIG. 4, the CPU 1 detects whether or not the select switch WR is OFF (S36).

If this switch is not OFF (S36→S46), the CPU 1 discriminates whether a WR.OFF flag (not shown; described later) in the CPU 1 is 1 or 0. If this flag is 0, the operation returns to the original status (S46→S45), and if the flag is 1, it is set to 0 and the operation returns to the original status (S46→S47→S45).

When the select switch WR is turned OFF (S36→S37), as the WR.OFF flag is 0, it is set to 1 (S37→S38) and all of four M1.RD to M4.RD flags (to be described later) are set to 1 (S39).

Subsequently, after processes associated with the individual select switches M1–M4 are executed as indicated by broken blocks 26–29 in FIG. 7, the operation returns to the original state (broken block 26→broken block 27→broken block 28→broken block 29→S45). Since the individual processes (broken blocks 26 to 29) are the same, a detailed description of the first process associated with the select switch M1 (as indicated by the broken block 26) will be given below.

First, it is detected whether or not the select switch M1 is ON (S40). If it is not ON, the operation advances to the next process associated with the select switch M2 (as indicated by the broken block 27).

If the select switch M1 is turned ON by the player's depressing this switch M1 (S40→S41), since the M1.RD flag is 1 (see S39), the individual pieces of data in the M1 data region 17 at the addresses 110–119 of the memory 4 are copied to the select data region 16 at the addresses 100–109 (S41→S42).

Subsequently, of the registration data copied to the select data region 16 through the above operation, the individual data (See FIG. 3) at the addresses 100–103 and 105–109 excluding the coupler data 21-4 at the address 104 are copied to the second tone generator 7 (S43).

After the above process, the M1.RD flag is set to 0 (S44) and the operation advances to the next process associated with the select switch M2 (see broken block 27).

Through the above operation, when the player turns only the select switch M1 of the registration select switches 5, the contents of the M1 data region 17 at the addresses 110–119 in the memory 4 are registered into the select data region 16 (FIG. 3) at the addresses 100–109. Further, at the same time, the content of the timbre/effect setting in the second tone generator 7 are instantaneously altered and the timbre/effect of the coupler tone is altered in real time. This permits the player to execute the above selecting operation even during musical performance at the desired timing.

When the player keeps the select switch M1 depressed and a timer interrupt occurs again as in S35 of FIG. 7 permitting the CPU 1 to detect the ON state of the switch M1, since the WR.OFF flag is already 1 in this case and the M1.RD flag is reset to 0, nothing will be done with regard to the switch M1 and the operation advances to the processes 26–29 associated with the other select switches M2–M4. This prevents the same data associated with the switch M1 from being selected (S37→S40→S41 broken block 27).

Even when the select switches M2–M4 are operated, the above operation will be executed in the same manner for selecting data from the M2–M4 data regions 18–20.

Tone Generation

Finally, a description will be given of a tone generation in a case where the player blows breath from the mouth section 15 while operating the pitch designation switches 2 with the fingers to designate a pitch.

The above operation is executed by the CPU 1 scanning the operational status of each of the pitch designation switches 2 at predetermined time intervals according to a predetermined tone generating program.

Figure 8:
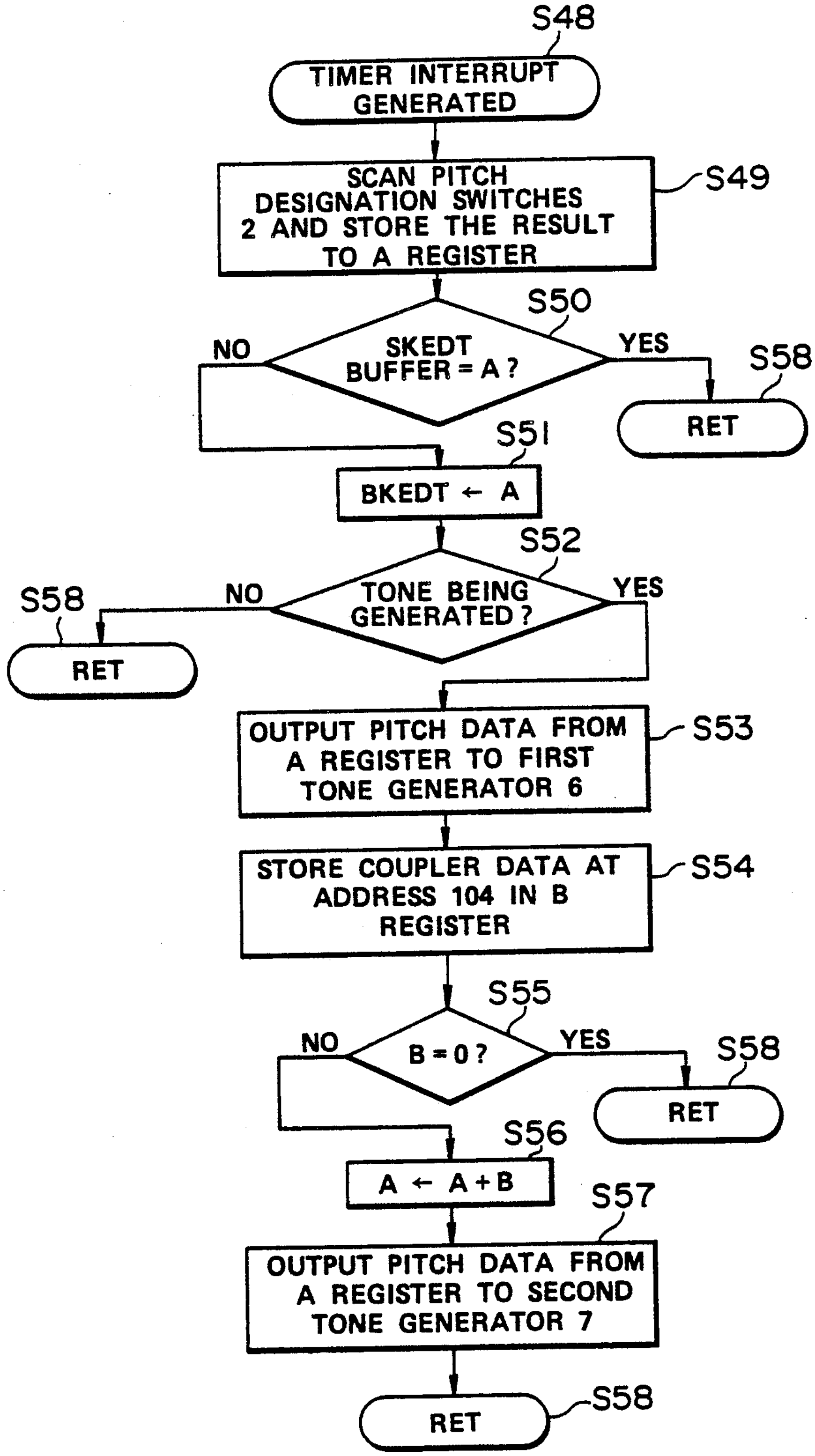
FIG. 8 is a flowchart for explaining a tone generating operation.

FIG. 8 illustrates an operational flowchart for this case. When a timer interrupt occurs (S48 in FIG. 8; please refer to FIG. 8 hereinafter) as in the case of FIG. 4, the CPU 1 scans the pitch designation switches 2 and stores pitch data (note code) determined by the scanning into the A register (not shown) in the CPU 1 (S49).

The CPU 1 has a buffer BKEDT that holds the content (pitch data) of the A register at the time of the previous scanning, and it discriminates whether or not the content of the buffer BKEDT coincides with the content of the A register (S50). If there occurs a coincidence, it is discriminated that the value of the pitch data is the same as the one attained at the time of the previous scanning. In this case, nothing is executed and the operation returns to the original state (S50→S58). This permits the first and second tone generators 6 and 7 to keep generating the same original and coupler tone.

When the contents of the buffer BKEDT and A register are not equal to each other, the content of the buffer is updated to be the content of the A register (S50→S51) and it is then discriminated whether or not a musical tone is being generated (S52).

Whether or not the musical tone is being generated is discriminated by the value of the digital data associated with the strength of the breath of the player blown through the A/D converter 9 from the breath sensor 11. More specifically, when the player blows his breath at a relatively high strength and the value of the digital data exceeds a predetermined value, it is discriminated that a musical tone is being generated.

If it is discriminated that no musical tone is being generated, nothing will be done and the operation returns to the original state (S52→S58).

When it is discriminated that a musical tone is being generated, by way of contrast, the pitch data set in the A register is output to the first tone generator 6 (S52→S53). This permits the first tone generator 6 to generate an original tone having a pitch based on the pitch data.

Then, the coupler data 21-4 (FIG. 3) or data about a coupler pitch difference as set at the address 104 in the select data region 16 in the memory 4 is stored in the B register (not shown) in the CPU 1 (S54).

Subsequently, it is discriminated whether or not the value of the B register is 0 (S55). If this value is 0, the coupler pitch difference becomes 0 making the original tone and coupler tone have the same pitch, no process for generating the coupler tone will not be executed in this case and the operation returns to the original state (S55→S58).

If the value of the B register is not 0, the pitch data of the original tone as set in the A register is added to the data about the coupler pitch difference as set in the B register to thereby provide pitch data of the coupler tone, and this data is newly set in the A register (S55→S56).

Subsequently, the pitch data of the coupler tone set in the A register is output to the second tone generator 7 and the operation returns to the original state (S57→S58). This permits the tone generator 7 to generate a coupler tone having the pitch based on the pitch data of the aforementioned coupler tone.

Through the above operation, merely designating one pitch by the player's operating the pitch designation switches 2 with his fingers permits the first tone generator 6 to generate an original tone having that pitch while permitting at the same time the second tone generator 7 to generate a coupler tone having a pitch attained by adding the designated pitch to the pitch difference of the coupler data 21-4 at the address 104 in the memory 4.

At this time, as has been explained in the earlier section associated with the selecting operation of the registration data, the content of the coupler data 21-4 at the address 104 in the memory 4 can be altered to the one registered in each of the M1–M4 data regions 17–20 (see FIG. 3) at the address 114, 124, 134 or 144 by turning ON an arbitrary one of the select switches M1–M4 of the registration select switches 5 during musical performance. Accordingly, the pitch difference of the coupler tone can be altered in real time.

Figure 9:
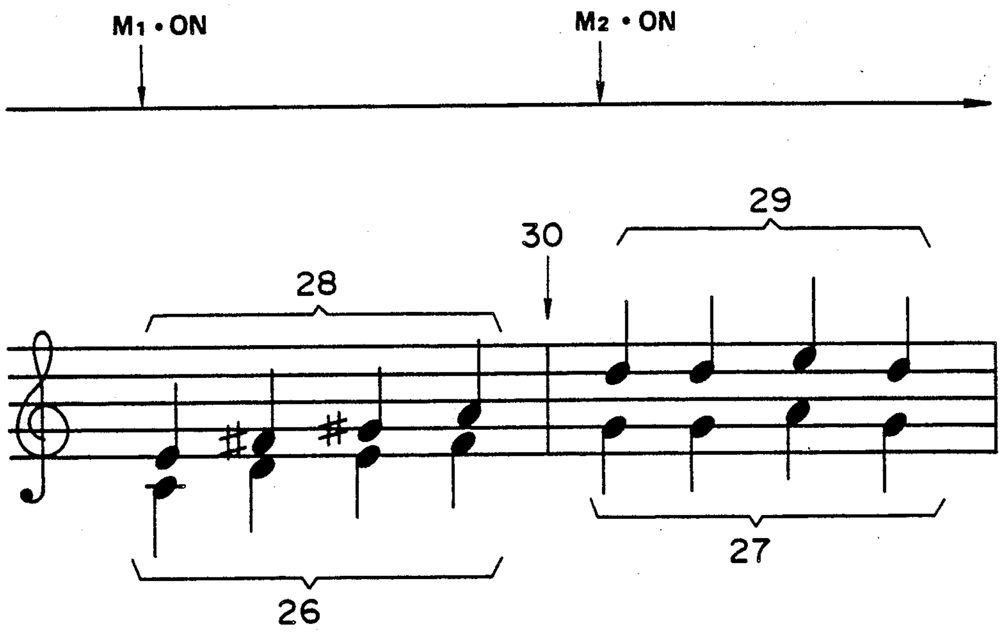
FIG. 9 is a diagram illustrating an example of a musical performance.

FIG. 9 illustrates an example of a performed musical piece. For instance, the player registers in advance the pitch difference of +4 as the coupler data 21-4 (FIG. 3) at the address 114 in the M1 data region 17 in the memory 4 and registers in advance the pitch difference of +7 as the coupler 21-4 at the address 124 in the M2 data region 18. When the player first turns the select switch M1 ON and designates the pitch indicated by numeral 26 in FIG. 9 operating the pitch designation switches 2, an original tone at this pitch and a coupler tone at the pitch indicated by numeral 28 in FIG. 9 having the pitch difference of +4 with respect to that of the original tone will be sequentially generated. When the select switch M2 is turned ON at the timing indicated by the arrow 30 and the pitch indicated by numeral 27 in FIG. 9 is designated, an original tone at this pitch and a coupler tone at the pitch indicated by numeral 29 in the same diagram which has the pitch difference of +7 with respect to that of the original tone will be sequentially generated. According to this embodiment, therefore, a finer coupler effect can be added to a musical tone.

According to this invention, it is possible to set and store in advance plural pieces of coupler pitch difference data in a memory and select an arbitrary one of the plural pieces of stored coupler pitch difference data with a single fingering operation even during musical performance. This invention can therefore permit even a novice player to play a variety of coupler performances.

Further, since the timbre, etc. of a coupler tone can be set different from that of an original tone for each pitch difference, the performance effect can be further improved.

In addition, since the coupler pitch difference can be viewed on a display, the player can play a coupler performance while viewing the display content. This can improve the operability for realizing such a coupler performance.

Although, according to the above-described embodiment, plural pieces of coupler data are individually selected by operating a plurality of registration select switches M1–M4, the arrangement of the embodiment may be modified in such a way that an arbitrary one of plural pieces of coupler data is selected using one registration select switch.

Further, although the first and second tone generators 6 and 7 and tone output section 8 are provided at the interior of the pipe section 14 serving as a main body of the electronic wind instrument according to the above embodiment, they may be provided on the outer side of the pipe section 14.

Furthermore, although, according to this embodiment, the foregoing description has been given with reference to this invention directed to an electronic wind instrument, this invention can also be applied to other electronic musical instruments such as an electronic keyboard instrument and an electronic xylophone instrument.

What is claimed is:

1. An electronic musical instrument, comprising:

pitch designation means for designating a first pitch;

pitch difference data designating means for designating pitch difference data representing an arbitrary pitch difference with respect to said first pitch to be designated by said pitch designation means;

pitch difference memory means for storing plural pieces of pitch difference data designated by said pitch difference data designating means;

a plurality of pitch difference data selecting means for individually selecting said plural pieces of pitch difference data stored in said pitch difference data memory means;

instructing means for, when said first pitch is designated by said pitch designation means with corresponding pitch difference data being selected by said pitch difference data selecting means, instructing at a same time a second pitch having a pitch difference corresponding to said pitch difference data selected by said pitch difference data selecting means;

air flow detecting means for detecting an air flow state induced by a player; and tone generating means for, when an air flow state is detected by said air flow detecting means, generating an original tone at said first pitch and a coupler tone at said second pitch in accordance with an instruction from said instructing means.

2. The instrument according to claim 1, wherein said pitch designation means comprises a plurality of pitch designation switch means, and said first pitch is designated by operating a combination of said plurality of pitch designation switch means.

3. The instrument according to claim 1, wherein said tone generating means comprises first tone generating means for generating an original tone at said first pitch and second tone generating means for generating a coupler tone at said second pitch.

4. The instrument according to claim 1, further comprising display means for, when said one pitch difference data is selected by said pitch difference data selecting means, displaying a content of said one pitch difference data.

5. The instrument according to claim 1, wherein said air flow detecting means and said tone generating means are provided at a musical instrument main body.

6. An input apparatus for use in an electronic musical instrument, comprising;

note designation means for executing a note designation to perform a playing operation;

memory means for storing plural pieces of interval difference data representing interval differences for designating different notes with respect to a note designated by said note designation means, prior to a playing operation;

interval difference selecting means for selecting an arbitrary one of said plural pieces of interval difference data stored in advance in said memory means in accordance with a playing operation;

first tone generation instructing means for giving an instruction to generate a musical tone corresponding to said note designated by said note designation means;

second tone generation instructing means for giving an instruction to generate a musical tone corresponding to a note attained by changing a note of said musical tone instructed to be generated from said first tone generation instructing means in accordance with said arbitrary interval difference data selected by said interval difference selecting means;

air flow detecting means for detecting an air flow state induced by a player; and tone generating means for, when an air flow state is detected by said air flow detecting means, generating an original tone at said first pitch and a coupler tone at said second pitch in accordance with an instruction from said instructing means.

7. The input apparatus according to claim 6, wherein said note designation means includes a plurality of note designation switches, and said note designation is executed by operation of a combination of said plurality of note designation switches.

8. An electronic musical instrument, comprising:

pitch designation means for designating a first pitch;

pitch difference data designating means for designating pitch difference data representing an arbitrary pitch difference with respect to said first pitch to be designated by said pitch designation means;

pitch difference memory means for storing plural pieces of pitch difference data designated by said pitch difference data designating means;

pitch difference data selecting means for selecting an arbitrary one of said plural pieces of pitch difference data stored in said pitch difference data memory means;

instructing means for, when said first pitch is designated by said pitch designation means with said arbitrary one pitch difference data being selected by said pitch difference data selecting means, instructing at a same time a second pitch having a pitch difference corresponding to said pitch difference data selected by said pitch difference data selecting means;

air flow detecting means for detecting an air flow state induced by a player; and tone generating means for, when an air flow state is detected by said air flow detecting means, generating an original tone at said first pitch and a coupler tone at said second pitch in accordance with an instruction from said instructing means.

9. An electronic musical instrument, comprising:

pitch designation means for designating a first pitch;

pitch difference data memory means for storing pitch difference data representing a pitch difference with respect to said first pitch to be specified by said pitch designation means;

pitch difference data designating means for designating said pitch difference data stored in said pitch difference data memory means; and instructing means for, when said first pitch is designated by said pitch designation means with said pitch difference data stored in said pitch difference data memory means being designated by said pitch difference data designation means, instructing at a same time a second pitch having a pitch difference corresponding to said pitch difference data designated by said pitch difference data designation means;

air flow detecting means for detecting an air flow stated induced by a player; and tone generating means for, when an air flow state is detected by said air flow detecting means, generating an original tone at said first pitch and a coupler tone at said second pitch in accordance with an instruction from said instructing means.

10. An electronic musical instrument comprising:

pitch designation means for designating a first pitch;

pitch difference data setting means for setting pitch difference data representing an arbitrary pitch difference with respect to said first pitch to be designated by said pitch designation means;

pitch difference memory means for storing plural pieces of pitch difference data set by said pitch difference data setting means;

timbre data designation means for designating an arbitrary one of plural pieces of timbre data;

timbre data memory means for storing said arbitrary one timbre data designated by said timbre data designation means, in association with said pitch difference data stored in said pitch difference memory means;

a plurality of selecting means for selecting as a pair said plural pieces of pitch difference data stored in said pitch difference data memory means and said plural pieces of timbre data stored in said timbre data memory means in association with said plural pieces of said pitch difference data; and instructing means for, when said first pitch is designated by said pitch designation means with corresponding pitch difference data and timbre data being selected by said selecting means, giving an instruction to generate an original tone at said first pitch and, at a same time, generate a coupler tone at a second pitch having a pitch difference corresponding to said pitch difference data selected by said selecting means and with a timbre corresponding to said timbre data selected by said selecting means.

11. The instrument according to claim 10, wherein said pitch designation means comprises a plurality of pitch designation switch means, and said first pitch is designated by operating a combination of said plurality of pitch designation switch means.

12. The instrument according to claim 10, further comprising tone generating means for, when instructed by said instructing means, generating an original tone at said first pitch and generating a coupler tone at said second pitch in accordance with an instruction from said instructing means.

13. The instrument according to claim 12, wherein said tone generating means comprises first tone generating means for generating an original tone at said first pitch and second tone generating means for generating a coupler tone at said second pitch.

14. The instrument according to claim 10, further comprising display means for, when said one pitch difference data is selected by said pitch difference data selecting means, displaying a content of said one pitch difference data.

15. The instrument according to claim 10, further comprising:

breath operation detecting means for detecting a status of a breath operation; and tone generating means for, when a breath operation is detected by said breath operation detecting means, generating an original tone at said first pitch and coupler tone at said second pitch in accordance with an instruction from said instructing means.

16. The instrument according to claim 15, wherein said breath operation detecting means and said tone generating means are provided at a musical instrument main body.

* * * * *

UNITED STATES PATENT AND TRADEMARK OFFICE
CERTIFICATE OF CORRECTION

PATENT NO. : 4,993,307

DATED : February 19, 1991

INVENTOR(S) : S. SAKASHITA

It is certified that error appears in the above-identified patent and that said Letters Patent is hereby corrected as shown below:

Title page, Section [56] References Cited --

Insert the following references:

U.S. PATENT DOCUMENTS -

| | | |
|---|---|---|
| 4,466,326 | 8/1984 | Ogura et al |
| 4,205,576 | 6/1980 | Deutsch et al |

FOREIGN PATENT DOCUMENTS -

| | | |
|---|---|---|
| 0 031 598 | 7/1981 | Europe |
| 2 104 700A | 3/1983 | United Kingdom |

Signed and Sealed this

First Day of December, 1992

*Attest:*

DOUGLAS B. COMER

*Attesting Officer* *Acting Commissioner of Patents and Trademarks*